(12) United States Patent
Becker et al.

(10) Patent No.: US 7,506,051 B2
(45) Date of Patent: Mar. 17, 2009

(54) METHOD AND APPARATUS FOR AUTOMATICALLY CONDUCTING HARDWARE INVENTORIES OF COMPUTERS IN A NETWORK

(75) Inventors: Craig Henry Becker, Austin, TX (US); Gregory Alan Flurry, Austin, TX (US); Jimmy Ming-Der Hsu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 969 days.

(21) Appl. No.: 10/674,979

(22) Filed: Sep. 30, 2003

(65) Prior Publication Data

US 2005/0071442 A1 Mar. 31, 2005

(51) Int. Cl.
*G06F 15/173* (2006.01)
*G06F 15/177* (2006.01)
(52) U.S. Cl. .......................................... 709/224; 713/2
(58) Field of Classification Search ......... 709/222–224; 713/1–2
See application file for complete search history.

(56) References Cited

U.S. PATENT DOCUMENTS

| | | | |
|---|---|---|---|
| 5,161,102 A | 11/1992 | Griffin et al. ................. | 395/800 |
| 6,209,089 B1* | 3/2001 | Selitrennikoff et al. ......... | 713/2 |
| 6,574,729 B1 | 6/2003 | Fink et al. ...................... | 713/1 |
| 6,711,676 B1* | 3/2004 | Zomaya et al. ............. | 713/100 |
| 7,124,412 B2* | 10/2006 | Fish et al. .................... | 719/310 |
| 2002/0078188 A1* | 6/2002 | Anand et al. ................. | 709/222 |
| 2002/0083183 A1* | 6/2002 | Pujare et al. ................. | 709/231 |
| 2004/0109017 A1* | 6/2004 | Rothman et al. ............ | 345/735 |

* cited by examiner

*Primary Examiner*—David Lazaro
(74) *Attorney, Agent, or Firm*—Duke W. Yee; Jeffrey S. LaBaw; LaRhonda Jefferson-Mills

(57) ABSTRACT

A method, apparatus, and computer instructions for conducting an inventory of a data processing system. When a basic input output system (BIOS) is launched during a boot process for the data processing system, the basic input output system creates a hardware report of the data processing system. This report is sent to a remote data processing system on the network.

7 Claims, 4 Drawing Sheets

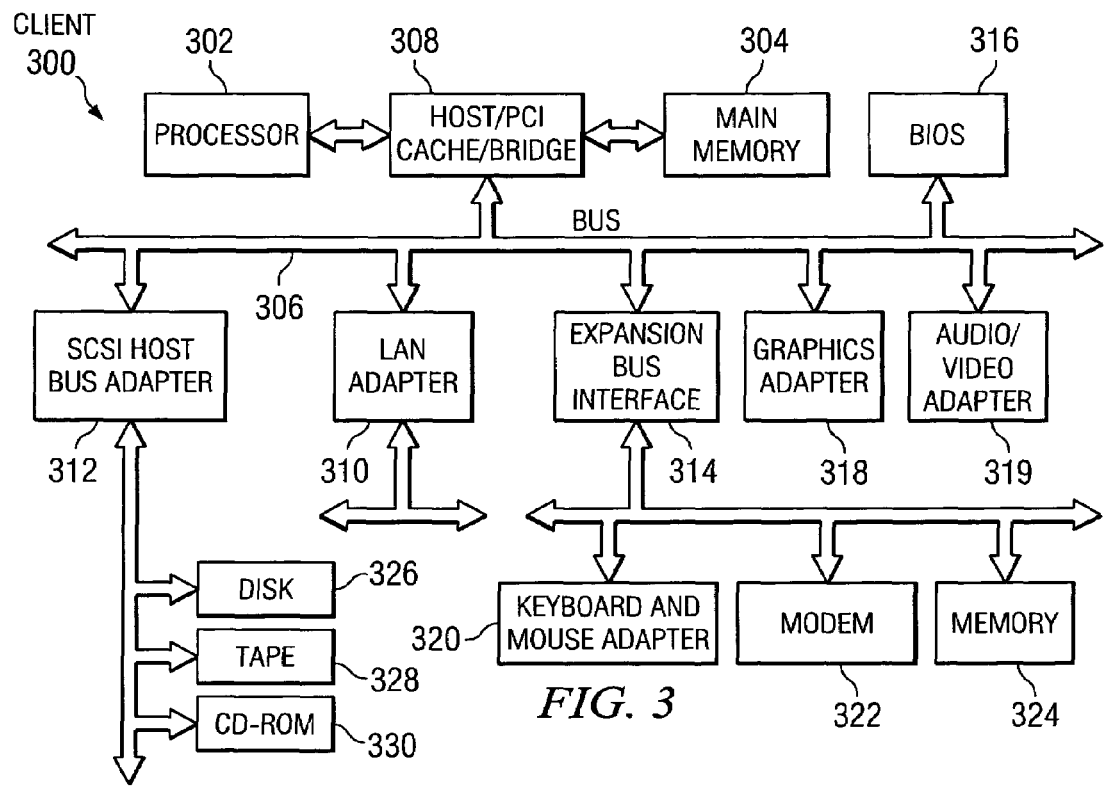
FIG. 3
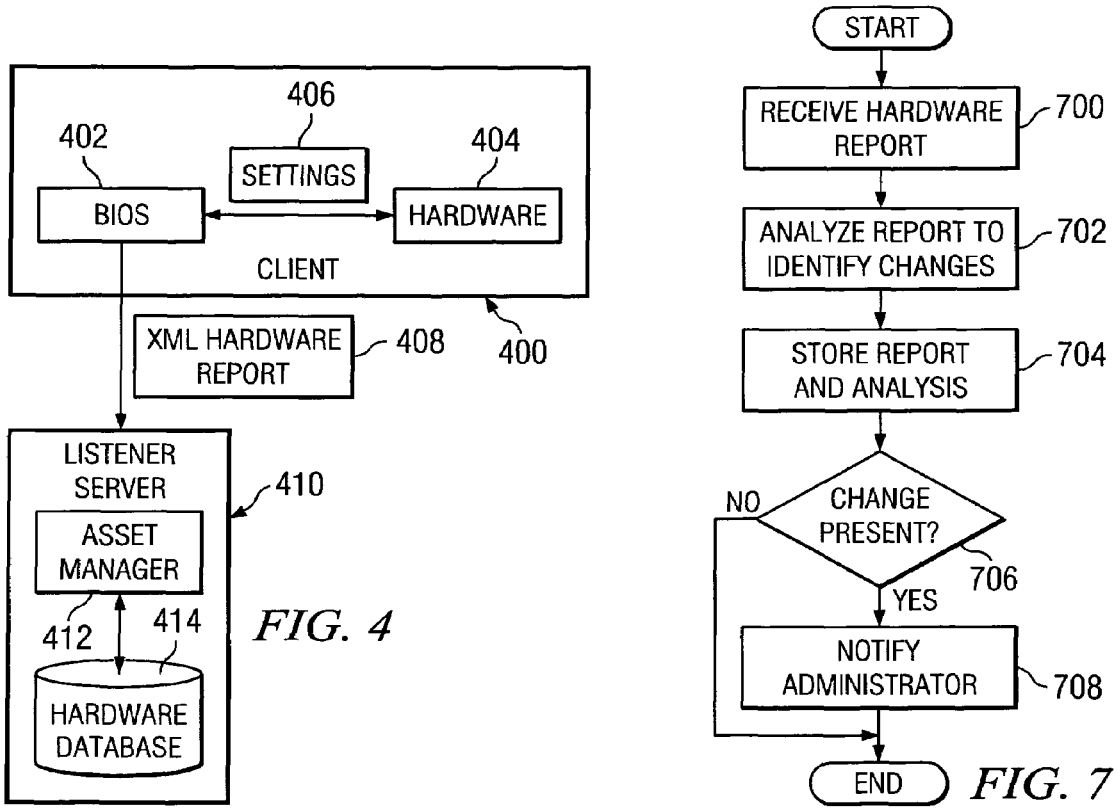
FIG. 4
FIG. 7

METHOD AND APPARATUS FOR AUTOMATICALLY CONDUCTING HARDWARE INVENTORIES OF COMPUTERS IN A NETWORK

BACKGROUND OF THE INVENTION

1. Technical Field

The present invention related generally to an improved data processing system, and in particular relates to a method and apparatus for conducting an inventory of a data processing system. Still more particularly, the present invention provides a method, apparatus, and computer instructions for conducting an inventory of a data processing system and sending the inventory to a remote data processing system.

2. Description of Related Art

A number of different client data processing systems and host data processing systems may be located on a network data processing system. Management of all the different data processing systems on a network can be time consuming and complex. Upgrades to software and hardware require knowledge of the software and hardware that is located on the different data processing systems in a network. This information may be gathered in different ways. One process is for administrators to physically go to each data processing system and perform an inventory. Another mechanism provides for an inventory to be automatically initiated on each data processing system with those results being returned to one or more collection points. IBM Tivoli Configuration Manager, available from International Business Machines Corporation, is an example of a management tool that allows for deployment of software across a network. This tool and other similar tools include a process that is initiated by the operating system to automatically collect software and hardware information about a data processing system and send that information to one or more collection points, also referred to as listener servers. This information is used in the deployment and management of software on the network.

One problem associated with this type of process is that a user may turn off such a feature. Also, in more and more data processing systems, multiple operating systems may be present and run at different times. Unless the inventory process is set up for each operating system, the inventory of the data processing system may not occur as desired in the instance when an operating system is started in which the inventory process is not set up for that operating system. Therefore, it would be advantageous to have an improved operating-system independent method, apparatus, and computer instructions for conducting an inventory on a data processing system.

SUMMARY OF THE INVENTION

The present invention provides a method, apparatus, and computer instructions for conducting an inventory of a data processing system. When a basic input output system (BIOS) is launched during a boot process for the data processing system, the basic input output system creates a hardware report of the data processing system. This report is sent to a remote data processing system on the network.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIG. 4 is a block diagram of components used to automatically obtain and transmit an inventory in accordance with a preferred embodiment of the present invention;

FIG. 7 is a flowchart of a process for receiving hardware reports in accordance with a preferred embodiment of the present invention.

DETAILED DESCRIPTION OF THE PREFERRED EMBODIMENT

Figure 1:
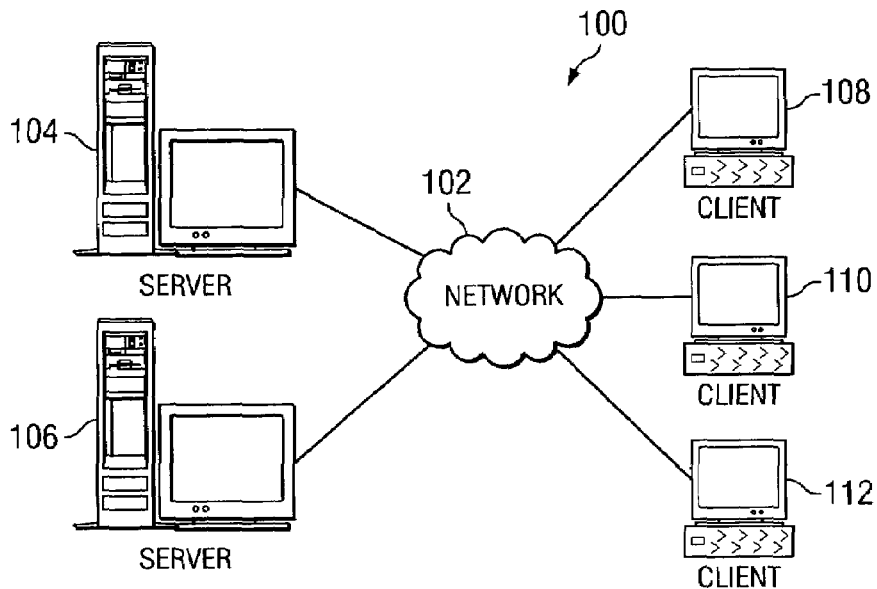
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 and server 106 are connected to network 102. In addition, clients 108, 110, and 112 are connected to network 102. These clients 108, 110, and 112 may be, for example, personal computers or network computers. In the depicted example, server 104 and server 106 provide data, such as boot files, operating system images, and applications to clients 108-112. Clients 108, 110, and 112 are clients to these servers. Further, clients 108, 110, and 112 may be managed by servers 104 and 106. These servers may serve as collection points for configuration information from clients 108, 110, and 112. These types of servers also are referred to as listener servers. In these examples, during booting, clients 108, 110, and 112 generate reports of hardware components and send those report to servers 104 and 106. Booting of a data processing system causes the data processing system to start executing instructions. Most data processing system include these instruction, also called BIOS's read only memory (ROM) or a flash memory. These instructions automatically execute on startup or "booting" of the data processing system.

Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
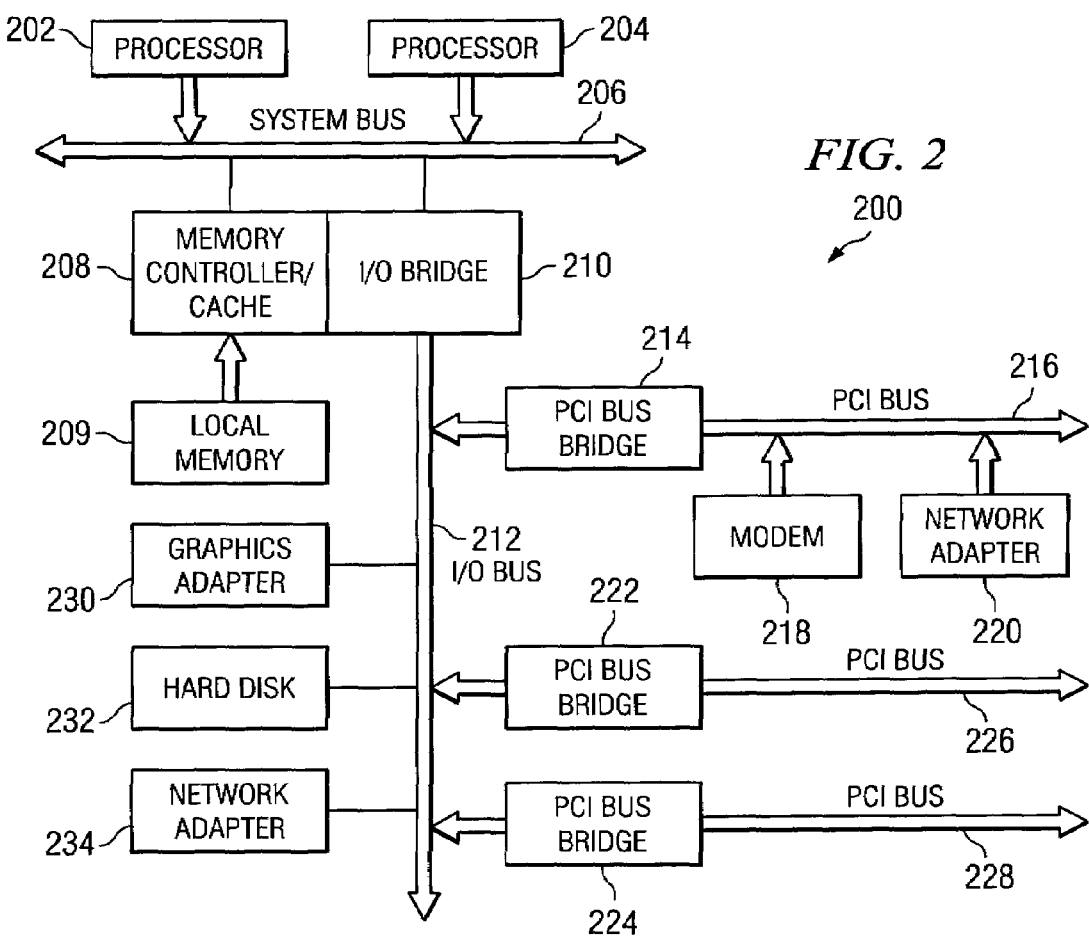
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. In these examples, data processing system 200 may be implemented as a listener server to collect and receive inventories from various clients on a network data processing system.

Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230, hard disk 232, and network adapter 234 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. For example, in some systems, Ethernet adapters are integrated into the motherboards.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system. With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection.

Basic input/output system (BIOS) unit 316 also is connected to PCI local bus 306. BIOS unit 316 is a nonvolatile memory, such as a flash memory in these examples, in which code or instructions for starting data processing system 300 are located. The BIOS for data processing system 300 functions to ensure all the other hardware components, such as chips, hard drives, ports, and processor function together. BIOS software in BIOS unit 316 has a number of different roles, but the most important role of the BIOS is to load the operating system. When data processing system 300 is turned on and processor 302 tries to execute its first instruction, processor 302 has to obtain that instruction from somewhere. Processor 302 is unable to obtain the first instruction from the operating system because the operating system is located on a storage device, such as hard disk 326, and the BIOS provides processor 302 with instructions to tell where the operating system is located.

Further, the BIOS also includes other common tasks, such as for example, a power-on self-test (POST) for all of the different hardware components in the system to make sure the components are working properly; activating other BIOS chips on different cards installed in the data processing system, such as those on a SCSI adapter and graphics cards; providing a set of low-level routines that the operating system uses to interface to different hardware devices, such as for example, the keyboard, display, serial ports, and parallel ports; and managing a collection of settings for components, such as hard disks and a system clock. In these examples, the BIOS in BIOS unit 316 also includes an inventory process for obtaining a hardware inventory of data processing system 300 during start up and sending the inventory to one or more collection points.

Graphics adapter 318 and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. Instructions for the operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance. The present invention provides an improved method, apparatus, and computer instructions for conducting an inventory on a data processing system. The mechanism of the present invention allows for an inventory of hardware components on a data processing system to be automatically taken and sent to a collection point each time the data processing system is started or booted.

More specifically, the mechanism of the data processing system is implemented in the software or code that is used to first start a data processing system. In these examples, that code is the BIOS. The resulting process is an inventory process that is independent of the operating system that is eventually run on the data processing system. When the BIOS is launched or executed during the booting of a data processing system, a hardware inventory of components in the data processing system is obtained. This inventory is placed into a report and sent to one or more collection points on the network, which are listener servers in these examples. This information is then used in the management of the network.

Turning next to FIG. 4, a block diagram of components used to automatically obtain and transmit an inventory is depicted in accordance with a preferred embodiment of the present invention. Client 400 includes BIOS 402, which may be located in a flash memory, such as BIOS unit 316 in FIG. 3. When client 400 is booted, BIOS 402 executes and obtains an inventory of hardware 404 in client 400. Options or settings for the type of inventory report, the collection point or points to which the report is sent, whether the report is sent, as well as other options with respect to the inventory of hardware 404 are stored in setting 406. In the depicted illustrations, setting 406 is only accessible with an appropriate password. This feature is included to prevent users from altering configuration settings, such as whether to send a report, in setting 406.

Extensible markup language (XML) hardware report 408 is sent prior to a user being able to change or alter configuration settings in setting 406. As a result, if the user selects a different collection point or listener server, another report is sent after that setting has been changed to the new collection point.

For example, setting 406 may be used to set the report type as extensible mark up language for XML hardware report 408. Other formats include, for example, hypertext markup language, America Standard Code for Information Interchange (ASCII) text, and simple network management protocol (SNMP).

In these examples, XML hardware report 408 also includes other information, such identifying information about client 400. A host name for client 400, an IP address, a media access control (MAC) address, a machine type, and serial number of the machine are examples of some identifying information that may be sent in XML hardware report 408 along with the hardware inventory. Any information useful in managing clients that is accessible to BIOS 402 while booting may be included.

XML hardware report 408 is sent to a default listener server, listener server 410 in these examples. Default listener server 410 is designated in setting 406 as the collection point in these examples, as well as other options. Of course, more than one listener server may be designated in setting 406. Alternatively if security is not of a high concern, the report may be broadcast over the network for any listener server to receive. Such an option also is stored in setting 406. Other options include, for example, the level of detail in the hardware report and identifying information to be included in the hardware report.

As illustrated, XML hardware report 408 is received by asset manager 412 in listener server 410. Information from XML hardware report 408 may be analyzed and stored in hardware database 414. Asset manager 412 is a program or suite of programs that are used to manage assets on a network. Asset management of clients may include, for example, maintaining license compliance on upgrading software and installing new software. Asset manager 412 may be implemented using IBM Tivoli Configuration Manager, which is available from International Business Machines Corporation.

In this manner, hardware inventory reports may be generated on a regular basis, such as each time a machine is booted or rebooted. The reporting occurs without user intervention or interference with the password authentication feature for turning reporting on and off in the BIOS settings. Further, this type of reporting is operating system independent. This means it avoids having to setup a reporting program for each operating system that may be placed on and used in a client.

Figure 5:
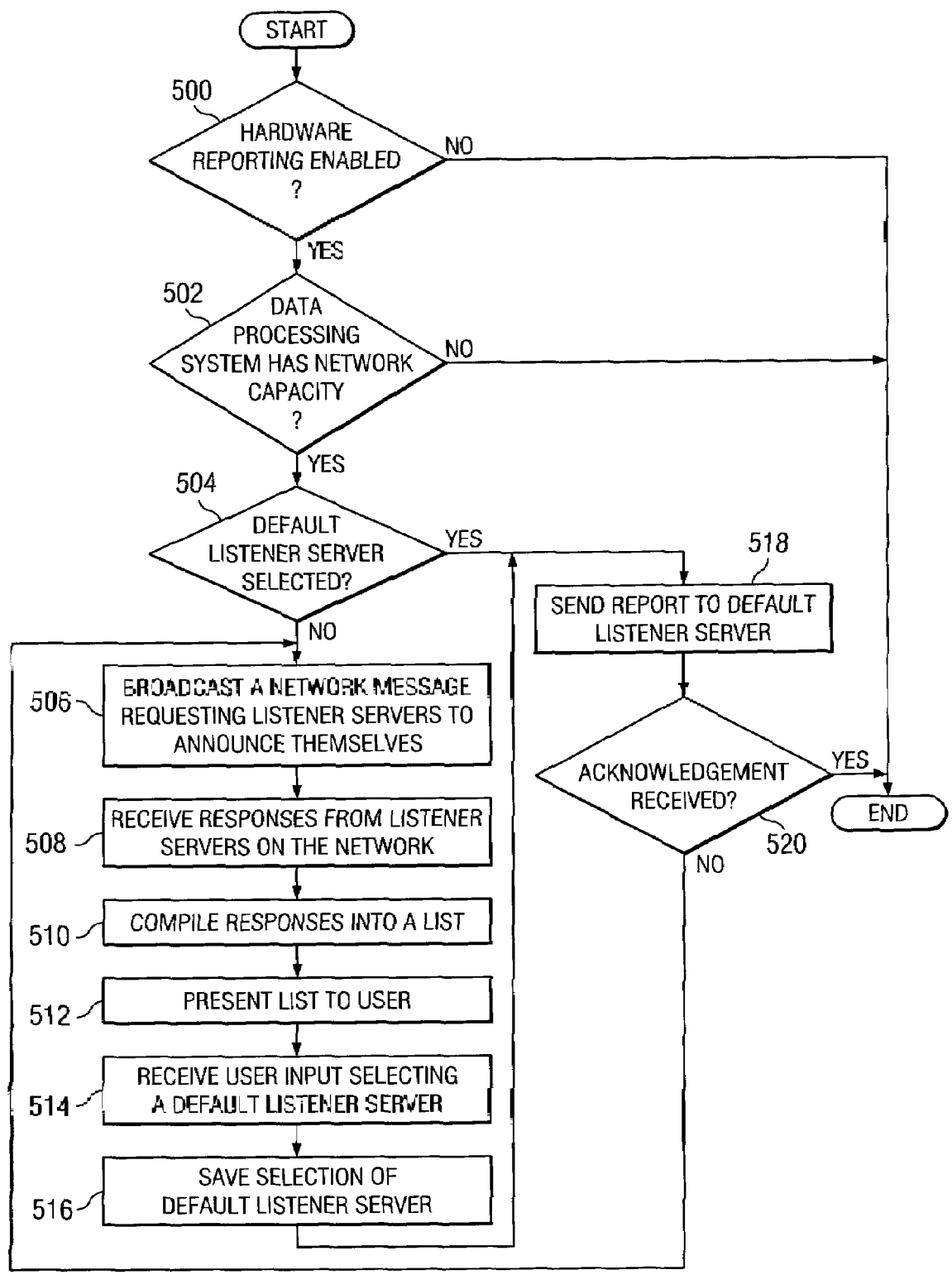
FIG. 5 is a flowchart of a process for generating a hardware report during booting of a data processing system in accordance with a preferred embodiment of the present invention.

Turning next to FIG. 5, a flowchart of a process for generating a hardware report during booting of a data processing system is depicted in accordance with a preferred embodiment of the present invention. The process illustrated in FIG. 5, may be implemented in a code that is executed when a computer is started or booted, prior to control being passed to an operating system, such as BIOS 402 in FIG. 4.

The process begins by determining whether hardware reporting has been enabled (step 500). After the hardware report has been generated, a determination is made as to whether the data processing system has network capacity (step 502).

If the data processing system is able to communicate over the network, a determination is made as to whether a default listener has been selected (step 504). If a default listener server has not been selected, a network message is broadcast, requesting listener servers to announce themselves (step 506). Responses are received from listener servers on the network (step 508). The responses are compiled into a list (step 510), and the list is presented to the user (step 512). The list is presented through a user interface to allow the user to select a default listener server.

User input selecting a default listener server is received (step 514). The selection of the default listener server is saved (step 516) and a report is sent to the default listener server (step 518). This hardware report may take various forms depending on the implementation. In these examples, an XML report sent using hypertext transfer protocol (HTTP) is employed.

Thereafter, a determination is made as to whether an acknowledgement has been received from the default listener server (step 520). Step 520 is employed to ensure that the report has been received by the intended collection point. If an acknowledgment is received, the process terminates. Otherwise, the process returns to step 506 as described above to select another default listener server. Depending on the implementation, the process may just terminate instead of selecting another default listener server.

With reference again to step 504, if a default listener server has been selected, the process proceeds directly to step 518 to send the report to the default listener server. Turning back to step 502, if the data processing system does not have a network capacity the process terminates.

Figure 6:
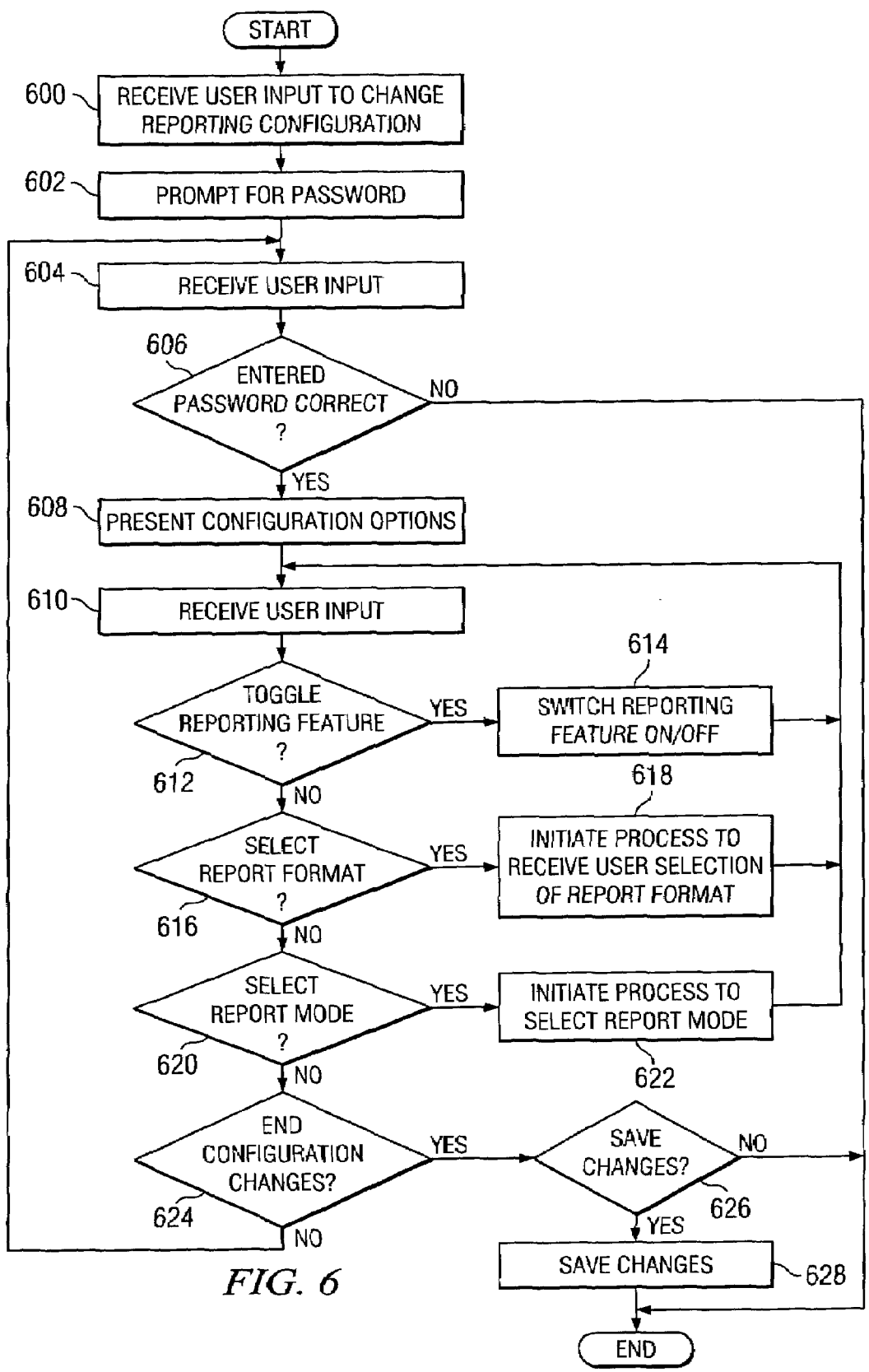
FIG. 6 is a flowchart of a process for setting configuration options for reporting hardware inventories in accordance with a preferred embodiment of the present invention.

With reference next to FIG. 6, a flowchart of a process for setting configuration options for reporting hardware inventories is depicted in accordance with a preferred embodiment of the present invention. The flowchart illustrated in FIG. 6 may be implemented in BIOS, such as BIOS 402 in FIG. 4 to set settings, such as setting 406 in FIG. 4.

The process begins by receiving a user input to change hardware reporting configuration (step 600). This user input is received on a user interface which is presented during booting. Specifically, when a data processing system is booting, the user may enter some preset key or keys to launch the user interface. This user interface allows various changes, such as changing hardware reporting configuration, changing power settings, changing a boot order for storage devices, and setting security features. In response to receiving this user input, a prompt for a password is made (step 602). A user input is received containing a password (step 604).

A determination is made as to whether the entered password is correct (step 606). If the password is incorrect, the process terminates. In this instance, the system continues to boot and load the operating system. Otherwise, configuration options are presented on the user interface (step 608). If user input is received selecting a configuration option (step 610).

Next, a determination is made as to whether the reporting feature has been toggled or changed (step 612). In this example, this option allows the reporting feature to be turned on or off. If this feature has been selected, the reporting feature is switched on or off depending on the prior setting (step 614) with the process then returning to step 610 as described above. If the reporting feature was previously turned on, the feature is now turned off and vice versa.

In step 612, if the selected configuration option is not to toggle the reporting feature, a determination is made as to whether the configuration option selected is to select a report format (step 616). If the option is to select the report format, then a process is initiated to receive a user selection of the report format (step 618) with the process then returning to step 610. Through this process, different report formats may be selected. For example, the report format may be XML, HTML, ASCII text, common interface management (CIM), or SNMP. Additionally, some combination of the different reporting formats may be used to provide multiple formats.

With reference again to step 616, if the configuration option selected is not the report format option, a determination is made as to whether the option selected is for a report mode option (step 620). If the report mode option is selected, a process to select a report mode is initiated (step 622). In step 622, the user may select different modes for sending hardware reports. In these examples, a single default listener is selected to receive reports. Through this configuration process a different listener server may be selected. Alternatively, two or more listener servers may be designated as collection points to receive reports. If security is not a high priority, step 622 may be employed to select a broadcast mode in which any listener server may receive the hardware report.

With reference again to step 620, if the configuration option selected is not the report mode option, a determination is made as to whether the user input is to end configuration changes (step 624). If the user input is not to end configuration changes, the process returns to step 604. Otherwise, a determination is made as to whether the changes should be saved (step 626). If the changes are to be saved, these changes are saved in a non-volatile memory (step 628) with the process terminating thereafter. Otherwise, the process terminates without saving the changes.

The configuration options illustrated in FIG. 6 are presented for purposes of describing an example of how a configuration process may be implemented. The different options are not meant as a number or type of options that may be actually provided. For example, a configuration option to select the amount of detail in a hardware report may be included in addition to or in place of those options illustrated in FIG. 6.

Turning now to FIG. 7, a flowchart of a process for receiving hardware reports is depicted in accordance with a preferred embodiment of the present invention. The process illustrated in FIG. 7 may be implemented in an asset management program, such as asset manager 412 in FIG. 4.

The process begins by receiving a hardware report from a client (step 700). The report is analyzed to identify changes in the hardware configuration of the client (step 702). This analysis may be made by comparing the hardware configuration identified in the report with the hardware previously identified and stored in a database, such as hardware database 414 in FIG. 4. This report and the analysis are then stored (step 704). In step 704, if the report is for a new system that has not been previously processed by the listener, a new record is created for the new system.

Next, a determination is made as to whether a change is present in the hardware in the client from which the report is received (step 706). If a change is present, an administrator is notified (step 708) with the process terminating thereafter. Otherwise, the process terminates without notifying the administrator. A notification may be made in many different ways. For example, the notification may be made through an email message, an text message to a mobile unit or a pager.

Thus, the present invention provides a method, apparatus, and computer instructions for tracking hardware on data processing systems through processes implemented in a BIOS. This mechanism allows for reporting to be set up without regard to the operating system being used. This mechanism allows for regular reporting to occur each time a data processing system is booted.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. In these examples, the clients are clients to servers. Clients also may be a client of a management domain, such that a client is any machine that reports its inventory to a server machine or server process. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for conducting an inventory of the data processing system, the computer implemented method comprising:

launching a basic input output system comprising an inventory process during a boot process for the data processing system, wherein the basic input output system initiates the inventory process, wherein the inventory process collects a hardware inventory of components in the data processing system, wherein the data processing system is one in a plurality of data processing systems in a network;

responsive to launching the basic input output system during the boot process of the data processing system, identifying, by the initiated inventory process, hardware components in the data processing system to form an inventory prior to the launching of an operating system; and sending a report comprising the inventory to a listener server on the network using a communications interface, prior to launching the operating system, wherein a format type of the report is type in a group consisting of extensible mark up language, hypertext markup language, text in a flat file, and simple network management protocol, and wherein the listener server collects and receives the report from each data processing system on the network, wherein the listener server is a default listener server, and wherein the identifying and sending are performed according to settings stored on each data processing system.

2. The method of claim 1 further comprising:

broadcasting a network message to a plurality of listener servers;

requesting each listener server on the network to announce themselves;

compiling responses from the each listener server to form a list;

presenting the list of the each listener servers, wherein user input is received containing a selection of a select listener server from the plurality of listener servers, for reporting hardware changes in the data processing system; and saving the selection as a default listener server.

3. The method of claim 2, wherein the broadcasting, compiling, presenting, and saving steps are initiated in response to an absence of a default listener server being present on the network.

4. The method of claim 1, wherein the report is used to identify changes to the data processing system.

5. The method of claim 1, wherein the listener server runs asset management software.

6. The method of claim 1 further comprising:

waiting for an acknowledgment of the report from the default listener server;

responsive to an absence of the acknowledgment of the report, by the default server, selecting a second default listener server; and sending the report to the second default listener server.

7. The method of claim 1 further comprising:

responsive to an absence of the default listener server, identifying listener servers on the network;

presenting a list of the listener servers for selection; and responsive to a selection of a listener server, saving the selection as the default listener server.

* * * * *